United States Patent [19]

Glover

[11] 4,427,542

[45] Jan. 24, 1984

[54] INLINE FUEL FILTER DEVICE

[76] Inventor: Richard E. Glover, 1092 Terrace Crest, El Cajon, Calif. 92020

[21] Appl. No.: 440,706

[22] Filed: Jan. 5, 1983

[51] Int. Cl.³ ............................................. B01D 33/00
[52] U.S. Cl. ................................... 210/121; 210/123; 210/388
[58] Field of Search ................... 210/437, 439, 416.4, 210/430, 388, 356, 351, 167, 86, 104, 122, 121, 123

[56] References Cited

U.S. PATENT DOCUMENTS

| | | | |
|---|---|---|---|
| 1,249,939 | 12/1917 | Falwell | 210/416.4 |
| 1,696,313 | 12/1928 | Liddell | 210/356 |
| 2,009,649 | 7/1935 | Carlson | 210/430 |
| 2,464,196 | 3/1949 | Ranst | 210/416.4 |
| 2,655,264 | 10/1953 | Thorne | 210/437 |
| 2,933,192 | 4/1960 | Gretzinger | 210/437 |
| 3,239,064 | 3/1966 | White | 210/416.4 |
| 3,395,803 | 8/1968 | Sumimoto et al. | 210/122 |
| 3,530,991 | 9/1970 | Phillips | 210/416.4 |
| 4,053,405 | 10/1977 | De Keyser et al. | 210/430 |
| 4,133,759 | 1/1979 | Ikeda et al. | 210/104 |

*Primary Examiner*—Charles N. Hart
*Assistant Examiner*—Wanda L. Millard

[57] ABSTRACT

This fuel filter device serves to eliminate the need for priming a fuel pump and bleed-air from fuel injectors, in the event that the fuel storage tank runs dry, or fuel filters are replaced on a fuel consuming device, which employs a fuel injecting system. Primarily, the device includes a housing, having a floating filter on its interior, which rides on a perforated fuel valve rod. The device also includes a floating ball valve attached to the armature of a solenoid, which is secured to a fuel output fitting in the bottom wall of the housing, and in the event of water in the fuel, the solenoid is actuated, and its armature will pull the ball valve down for positive shut-off of fuel flow.

1 Claim, 1 Drawing Figure

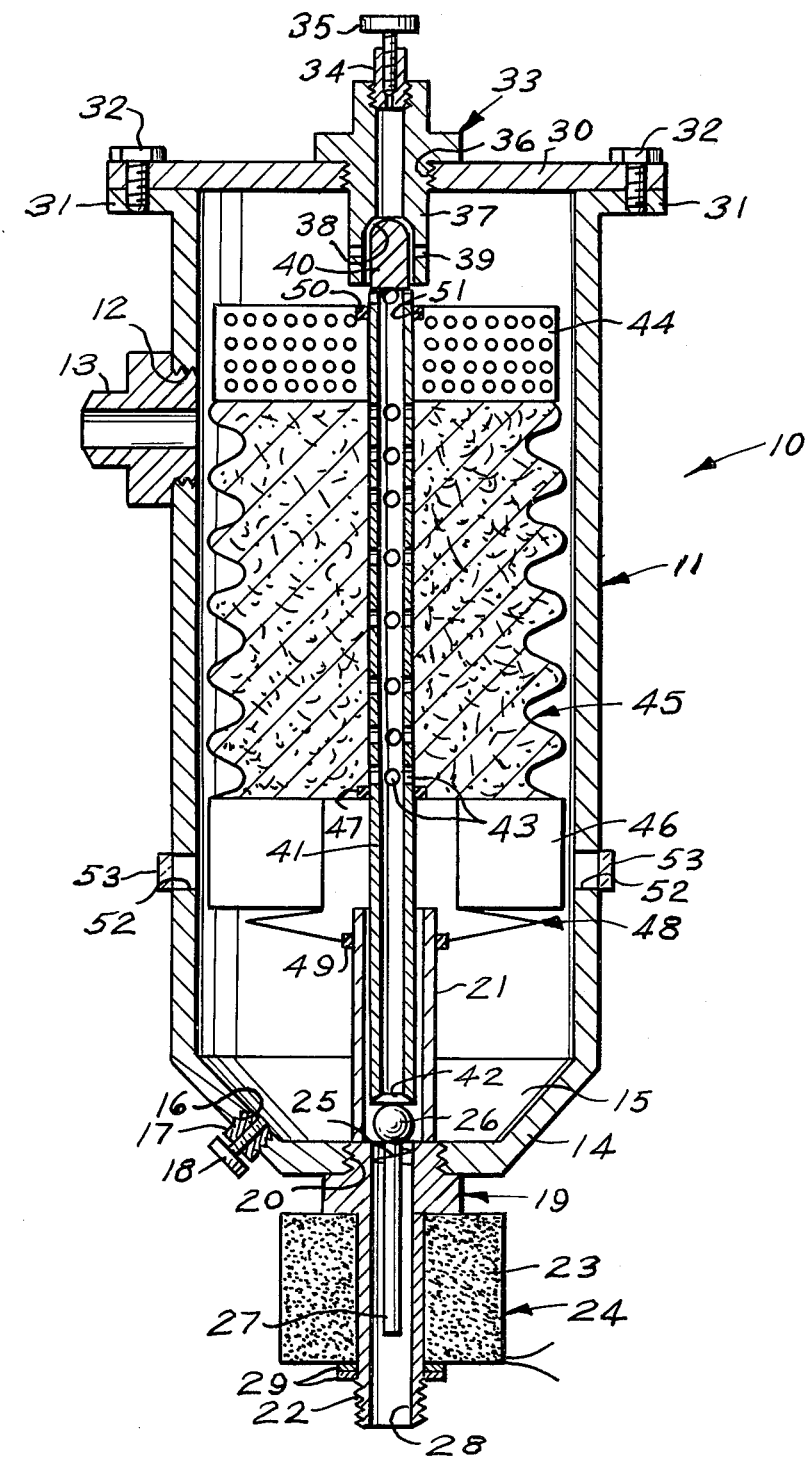

INLINE FUEL FILTER DEVICE

This invention relates to fuel systems of internal combustion engines, and more particularly, to an inline fuel filter device.

The principal object of this invention is to provide an inline fuel filter device, which will eliminate the need for priming a fuel pump and bleeding air from fuel injectors, in the event that the fuel storage tank runs dry, or fuel filters are replaced on a fuel consuming device employing fuel injecting system.

Another object of this invention is to provide an inline fuel filter device, which will be so designed that, in the event of water being present in the fuel, its electric sensor will energize an electric solenoid coil, causing the solenoid armature, which is fixed to a spring-loaded ball, to pull down for positive shut-off.

A further object of this invention is to provide an inline fuel filter device, which may also incorporate a low fuel sensor and water in fuel sensor, if desired.

Other objects of the present invention are to provide an inline fuel filter device, which is simple in design, inexpensive to manufacture, rugged in construction, easy to use and efficient in operation.

These, and other objects, will be readily evident upon a study of the following specification and the accompanying drawing.

The drawing is the sole view of the present invention, and is a vertical cross-sectional illustration.

Accordingly, a device 10 is shown to include a hollow cylindrical canister or housing 11, having a threaded side opening 12, which receives a threaded input fitting 13, for the entrance of fuel. A tapered bottom wall 14 is integrally attached to housing 11, and forms a sump or sediment area 15. A threaded and offset opening 16, through bottom wall 14, receives a drain cock 17, having a removable screw 18 for draining off any sediment, and an output fitting 19 is threaded into opening 20 through bottom wall 14. The upper end 21 of output fitting 19 serves as a dam, to prevent sediment from flowing out of fitting 19 of housing 11, and the lower threaded end 22 of fitting 19 is received in the center of coil 23 of electric solenoid 24, for a purpose which hereinafter will be described. A coil spring 25 is fixedly secured in the upper threaded portion of output fitting 19, and a floating ball valve 26, received in upper end 21 of fitting 19, is fixedly secured, in a suitable manner, to one end of solenoid armature 27, which is freely received in the lower bore 28 of output fitting 19. Solenoid 24 is rendered secure to lower end 22 of fitting 19, by means of a pair of nut fasteners 29, and a cover plate 30 is secured to the upper flange 31 of housing 11, by a plurality of spaced-apart bolt fasteners 32.

A purge valve 33, having a sleeve 34 and a threaded screw 35, is threaded into central opening 36 through cover plate 30, and its lower valve rod guide 37 portion includes a seat 38 and a transverse weep opening 39. The upper end 40 of a fuel valve rod 41 seats against seat 38, and the lower end is provided with a chamfered seat 42, for seating ball valve 26. A plurality of radially spaced-apart openings 43, through fuel valve rod 41, provides for the passage of fuel, and a filter float 44 is fixedly secured, at one face, to the top of a bellow-shaped filter 45. A fuel pan 46 is fixedly secured to the bottom of filter 45 is a suitable manner, and a gasket or other device 47 is secured in the bottom of filter 45, and is secured to fuel valve rod 41 in a suitable manner. A fine mesh liquid-proof fabric, accordion bellows type seal 47, is fixedly secured, at its top, to the bottom of filter 45, and its bottom open end 49 is press-fit to the outer periphery of upper end 21 of fitting 19, which serves as a dam against sediment. The upper end of filter float 44 also includes a central ring 50, fixedly secured in its opening 51, which is freely received on fuel valve rod 41, and a pair of oppositely opposed ports 52, through housing 11, are covered with a suitable transparent material 53, so as to enable viewing through device 10.

In use, device 10 is secured in the fuel lines, not shown, by means of fittings 13 and 19. Fuel passes through input fitting 13, through filter 45, through openings 43 of fuel valve rod 41, past spring 25 opened floating ball valve 26, and out of output fitting 19. When fuel is present in housing 11, the filter 45 and valve rod 41 are floated upward by the buoyancy of float 44.

In the event that the fuel tank runs dry, device 10 will deplete the fuel in housing 11, to a point below float 44, enabling filter 45 and valve rod 41 to fall against spring-loaded ball valve 26, overcoming spring 25 pressure, and stopping fuel supply to the fuel consuming device, causing it to starve and stop before air is allowed to enter the secondary fuel injector pump and injector lines.

The ball valve 26 closing pressure is provided by the weight of the fuel saturated filter 45, and the fuel weighted pan 46.

When fuel is introduced into the device 10, air is allowed to escape through the weep opening 39 and out of purge valve 33. As the air is expelled, fuel rises above float 44, to raise filter 45 and valve rod 41 against valve seat 38. After, the abovementioned device 10 is then operational without air in the secondary system.

In the event of water in the fuel, an electric sensor, now shown, will energize the solenoid armature 27, which will pull the ball valve 26 down against the upper end of bore 28, for positive fuel shut-off.

While various changes may be made in the detail construction, it is understood that such changes will be within the spirit and scope of the present invention, as is defined by the appended claims.

I claim:

1. An inline fuel filter device, comprising, in combination, an upright, cylindrical housing forming a central chamber, a fuel input opening along a cylindrical side of said housing, a fuel output opening through a bottom wall of said housing, a tubular output fitting screwed in said fuel output opening including an upwardly extending sleeve forming a sump therearound within a lower end of said housing, an outwardly downward end of said output fitting being mounted on an electric solenoid, a floating ball valve inside said output fitting affixed on an armature of said solenoid; a large opening at a top of said housing being closed by removable coverplate, a manually openable purge valve mounted through said coverplate for communication with said chamber, including a hollowed seat at its lower end, and a floatable filter unit supported between said seat and said ball valve; said floatable filter unit comprising a filter float mounted upon a bellows-shaped filter, a fuel pan affixed to a bottom of said filter and a tubular fuel valve rod extending through said filter float, filter and fuel pan, an upper end of said fuel valve rod being seated in said seat while a lower end thereof extends inside said sleeve for selective abutment with said floating ball valve, said tubular rod including transverse means for fuel from said filter to enter into said rod, and a bellows seal being between said filter and said sleeve.

* * * * *